United States Patent

[11] 3,615,655

[72] Inventors Jere E. Freeman
Hinsdale;
Richard M. Olson, North Riverside, both of Ill.
[21] Appl. No. 654,360
[22] Filed July 19, 1967
[45] Patented Oct. 26, 1971
[73] Assignee CPC International Inc.
New York, N.Y.

[54] METHOD FOR PREPARING HIGH PROTEIN CEREAL GRAIN PRODUCT
9 Claims, No Drawings

[52] U.S. Cl. .................................................. 99/17,
99/2 E, 99/80 G, 99/90 HP
[51] Int. Cl. ...................................................... A23j 1/12,
A23l 1/10
[50] Field of Search ............................................ 99/17, 80
G, 80, 80.1, 90 HP, 93

[56] References Cited
UNITED STATES PATENTS
Re. 22,748 4/1946 Levin ........................... 99/80
2,879,167 3/1959 Grandel ........................ 99/80

*Primary Examiner*—Raymond N. Jones
*Assistant Examiner*—James R. Hoffman
*Attorneys*—Frank E. Robbins, James L. Bailey, Janet E. Price and Martha A. Michaels ABSTRACT: A protein rich product which is particularly useful for human consumption is prepared from a cereal grain by rupturing the cells of the cereal grain germ, abrading the ruptured germ to free adherent protein particles from the remainder of the germ cell fragments, and separating out a protein rich fraction low in fiber content from a protein lean germ residue fraction, relatively high in fibrous type materials.

METHOD FOR PREPARING HIGH PROTEIN CEREAL GRAIN PRODUCT

There is an ever continuing interest in producing economical, palatable and nutritious food products, particularly for market in the developing countries. There is a special striving to produce a low cost vegetable product which is relatively high in protein content, and yet has good nutritional quality. The proteinaceous product must also have little, if any, objectionable odor, and when used in a foodstuff of one type or the other impart nutritional qualities to the final product without resulting in development of objectionable properties such as off-color, poor taste, induced spoilage, and other drawbacks.

Thus, for example, at present soy protein is utilized for its nutritional value and is employed in such final food products as bread and the like. However, supply of products rich in soy protein is limited, and such products are expensive in the relative sense. Also, without some purification, which greatly increases the cost, protein-containing soy products impart a somewhat undesirable taste to the final food product, and such soy-containing products are not completely accepted by those accustomed to obtaining protein values from other sources.

It is known that corn germ is potentially a good source of protein. The protein content in cereal germs is of much better nutritional quality than that protein which may be obtained from the endosperm portion of the cereal grain. However, to date, there is no simple, low cost yet efficient method of upgrading the protein content in germ to produce a protein rich fraction relatively low in fiber content such that it will be useful for human consumption.

More specifically, cereal endosperm proteins are in general low in the essential amino acids, lysine, tryptophan, and to some extent methionine. Protein from corn germ, on the other hand, has been reported to have both good amino acid balance and high biological value. Thus, because of its low cost and nutritionally good protein, spent corn germ has frequently been suggested as having potential use in food products. A major obstacle to the use of corn germ in food products is, however, its relatively high content of fibrous materials and its characteristic bitter flavor. Attempts to obtain corn germ protein in a form more suitable for food use have generally been unsatisfactory because of low product yields and/or high processing costs. These procedures have generally utilized classical procedures of dissolving protein by chemical (alkaline) means and precipitating with acid.

Corn germ is also a potential source of a fibrous product which can easily be fractionated into cellulose and hemicellulose components. The hemicellulose component can be used for the same end-applications as the commercial vegetable gums are now utilized or as a source material for furfural production. Cellulose from this source could be used in any of the many applications that cellulose is now used such as in the manufacture of viscose rayon, cellophane, lacquers, etc. However, starch which is normally present in the spent germ flake is solubilized under the alkaline conditions needed to dissolve the hemicellulose and cannot readily be separated therefrom.

At present, the germ portion of cereal grains like corn and grain sorghum is deoiled, usually pressed to expel the oil, and the spent germ marketed as a source of animal feed only. In some instances, the corn or sorghum grain germ is also extracted with a solvent after the initial pressure squeezing step to increase total yield of valuable germ oil. In any case, whether a process of germ pressing is used alone or in combination with solvent extraction, the germ residue is generally sold for livestock feed. As mentioned above, the spent germ is not high enough in total protein content and too high in fiber content to be considered a suitable nutritious food product fit for consumption by humans.

Usually the spent germ flake is used as an ingredient of corn gluten feed which is sold for consumption by animals. The gluten feed also contains steepwater from the grain processing, grain hulls, and incompletely softened endosperm material consisting primarily of proteinaceous and fibrous cell components. However, again the total corn gluten feed product is a fibrous material that is unsuitable as a feed or food product for nonruminants, although it is an excellent source of an animal feed. If by some means the germ portion of corn gluten feed could be processed to produce a fraction high in protein and thereby much higher in nutritional value, the protein rich germ material could also be used to give a much improved product for human or animal consumption.

In view of the above, it therefore becomes an object of the invention to provide a method of deriving from cereal grain germ a product of a relatively high protein content.

A more specific object of the invention is to provide a simple, yet efficient procedure for separating a cereal grain germ such as corn or sorghum grain germ into two fractions, one high in protein which may be thus humanly consumed, and the other relatively low in protein which may still be used as a source of animal feed or in other more valuable uses.

A still further object of the invention is to provide a protein rich material derived from a cereal grain germ by a method which is simple and easy to accomplish and does not require special expensive equipment to carry out the various steps.

Another object of the invention is to produce a protein rich product derived from corn germ which may be used in such foodstuffs as bread and the like and is a suitable replacement for soy or other protein sources in food products.

Still another object of the invention is to devise a simple yet efficient process for fractionating spent corn germ into protein rich, and protein lean fractions having chemical and physical properties which make them more suitable than the originally processed spent corn germ for a number of specific applications.

Another specific object of the invention is to produce an edible corn germ fraction of improved flavor, increased protein and reduced fiber content.

Other objects will appear hereinafter.

In accordance with the invention we have discovered a novel method of preparing from a cereal grain germ a protein rich product useful for human or animal consumption. In its broadest aspects, the invention includes the steps of rupturing the cells of a cereal germ, abrading the ruptured germ to free protein particles which adhere to the ruptured germ and separating the thus freed protein particles from the remainder of the ruptured germ cell fragments. A protein rich germ fraction is thus produced which has a relatively low content of fibrous material. Also, a fibrous germ residue fraction is produced which is relatively low in protein content. Both fractions are useful, with the high protein content portion being particularly suitable for human consumption in a number of food materials such as bread, and the fibrous fraction being useful as a source of cellulose and hemicellulose, each of which has many well-known and useful applications.

The first step in the invention involves rupturing the germ cell walls in order to partially free the proteinaceous fraction. The starting material may be either a spent grain germ such as a spent corn germ or whole previously unprocessed grain germ. Preferred for purposes of the invention as a starting material is a spent or already deoiled grain germ.

Spent germ, that is deoiled grain germ, such as corn or grain sorghum germ may be conventionally produced by either dry or wet milling schemes. In the usual wet milling system cleaned whole grain is softened by steeping for about two days in warm water that is acidified with a small amount of sulfur dioxide. The temperature of the steepwater is normally maintained between about 116° and 132° F. After steeping, the grain, usually containing 45–55 percent moisture, is coarsely ground in "degermination" mills to liberate the germ. The germ is then separated from the remainder of the constituents of the hole grain by flotation on a starch slurry or by mechanical separation in hydroclones. Separation by either method is possible because of the lower density of the steeped germ which contains about 45–55 percent oil on a dry basis. The germ is then washed, dried, heated and put through continuous mechanical screw presses. Here under stress of the high pressure most of the oil is pressed out while the solid part of the germ, still containing some residual oil is usually sold for animal feed. The solid residue of the germ is usually designated as "spent germ." In some instances after the oil is removed by pressing, the residual is flaked and solvent-extracted with hexane in a countercurrent flow technique. A typical analysis of the extracted form of spent germ flake may be 2 percent fat, 24 percent protein, 16 percent starch, 10 percent crude fiber (cellulose), 22 percent pentosans (hemicellulose), 2.6 percent lignin and 2 percent ash. The solvent-extracted material is also sold for livestock feed, usually as an ingredient of corn gluten feed.

Spent germ may be also derived from a dry milling technique. Here no preliminary steeping is involved. Usually the grain is tempered or conditioned to bring the moisture up to a predetermined level. After moisture adjustment, the grain may be passed through a series of cracking and reducing rolls, or break rolls, to break the kernels apart and give a mixture of bran, germ and endosperm particles. In more modern corn dry milling plants, the germ may be freed from the residual of the tempered kernel by such mechanical means as Entoleter mills or Beall degermination mills. In either case the mixture of germ, bran, and endosperm is sifted to effect a separation between hulls and germ on the one hand and grit or endosperm particles on the other. Most of the bran can be separated from the germ by aspiration. The germ from the dry milling process is also expelled and may be subsequently extracted by essentially the same procedure as used with wet-milled germ. However, in either case the spent germ residue from these procedures has too much fiber and not enough protein to be used in human foodstuffs. Development of such a relatively high protein fraction from spent germ is a major object of the instant invention.

In summary, cereal germ cell rupture can be effected by subjecting the germ to either a hammer mill or an impact mill, through means of pressure such as by a mechanical screw press, by means of an extruder, by subjecting the cereal grain to abrasion by corrugated rolls, by conditioning the germ through exposure to any sharp surface such as a knife or blade, etc. In essence, all that is necessary is to create a new surface, thereby exposing the protein and making it available for release in the subsequent step. Greatly preferred for purposes of the instant invention as an initial step are the conventional wet or dry milling techniques including pressure germ rupture described above. Thus, the whole germ may be ground dry or in water or in some organic solvent such as hexane to thereby break the cell walls and bring the formerly encapsulated protein to the surface of the particle. It should be understood, of course, that a substantial amount of the protein material while thus exposed is still adherent to the remainder of the germ, and must be freed up in some manner to yield a useful fraction.

The next step in the invention involves freeing the protein particles from the remainder of the germ cell. This is best accomplished by abrading in some manner the ruptured germ substance to thereby release the protein rich fraction from the surface of the cell fragments. This can be best accomplished by subjecting the particles in some manner to a type of frictional force. Conventional impact and attrition mills are most suitable here. Thus, a spent cereal germ may be subjected to an impact mill to thereby free the protein particles, that is, by rubbing or abrading the surface of the germ cell the tightly adherent protein fraction is released. For best results, this step should be carried out when the already ruptured germ is in a liquid slurry form. As an example, spent cereal germ such as spent corn germ may be slurried up in water and subjected to an impact mill to free the proteinaceous material.

The abrading step need not necessarily be effected by subjecting the ruptured germ to a mechanical force. For example, the germ may be put under an ultrasonic field for a time sufficient to separate the protein rich and protein lean fractions. Again, the abrasion phenomenon may be carried out by merely subjecting the ruptured germ to liquid flow forces. Thus, a slurry of ruptured germ in a nonpolar solvent such as hexane, heptane or other aliphatic solvents may be prepared and the slurry agitated to the desired degree to free the protein fraction. We have found that even with this relatively mild treatment the protein is freed up as a suspension in the solvent.

As just one single example of this step of freeing protein, an already dry or wet ground germ may be slurried up in hexane and then agitated as desired. The hexane both washes out the protein particles contained within the cell and simultaneously extracts the desired oil constituent. The ground matrix or protein lean, fibrous material is then separated from the protein rich fraction suspended in the oil and hexane liquid mixture as further described. Thus, in essence, both extraction of germ oil and freeing or protein can be effected simultaneously in an embodiment of this type. The advantages of carrying out this type of procedure should be apparent.

The last step of the invention involves separation of the two germ fractions. We have discovered that the protein rich fraction of the germ is of a materially lesser average particle diameter, compared to the fibrous or protein lean fraction. Specifically, the particles forming the protein rich fraction have an average particle diameter of less than about 40 microns. The greater proportion of the proteinaceous material has a particle diameter less than 20 microns, with the greatest percentage of the product falling within about 1–10 microns in particle size. The fibrous fraction, on the other hand, has a particle diameter substantially greater than 40 microns, and usually is of a diameter greater than 100–300 microns.

Thus, it is a simple matter to take advantage of this difference in physical size of protein rich and protein lean fractions to thereby separate them by some classification means. If, for example, the mixed fractions are in dry form they may be screened or classified, such as via air classification. Again, any type of centrifugal separation could be carried out here to effect a relatively clean separation of fractions. For example, the materials may be subjected to liquid hydroclones, to cyclone treatment or to centrifugation by means of horizontal bowl centrifuges.

If the protein has been freed by agitating it in slurry form such as by agitating hexane solvent, it is a simple matter then to separate the fractions by subjecting the entire mixture to centrifugation such as by means of liquid cyclones. The smaller protein rich fraction goes to the overflow with the hexane and oil and is thus separated out from the germ matrix or fibrous residue. The hexane may be then stripped off by evaporation, and the proteinaceous solids suspended in oil separated therefrom by filtration. The separation may also be effected through means of a centrifuge. To maximize the efficiency of this step the suspension before separation can be screened to remove the gross particles, and then the liquid suspension remaining may be subjected to centrifugal forces as described. We have also found that addition of water in small amounts, say 1–5 percent by weight of the total mixture, helps to effect a cleaner centrifugal separation. The water addition tends to swell the protein rich fraction, thereby increasing the separability of the proteinaceous solids from the mixture of germ oil and hexane or other suitable extraction solvent. Generally the water should be added to the suspension of protein fraction in organic solvent-germ oil mixture after the fibrous residue has been removed by centrifugation or other means.

As yet another illustration of typical ways to separate the two fractions in question, use of a cloth or wire screen having apertures of a size sufficient to allow the smaller sized protein rich fraction through and retain the fibrous residue is quite suitable in effecting this step of the invention. Thus, for example, a cloth such as a bolting cloth of desired mesh size may be utilized here.

For purposes of greater efficiency the fibrous residue retained on the screen or separated out from the proteinaceous product by some other means can also be recycled and again abraded to release additional protein rich material. The mixture of fractions can then be again subjected to classification as described.

After separation, the various fractions may be utilized as such or dried if desired. The protein rich product has been found to be admirably suited for use in a number of human food products such as in bread. The proteinaceous material may likewise be used as an animal feed. The protein rich fraction may vary widely in its protein content depending upon the particular method of freeing protein from the remainder of the germ cell, and the mode of classification of fractions utilized. Generally the protein content varies from about 30 percent to as high as 70 percent or greater.

The fibrous residue, on the other hand, is relatively low in protein and generally contains less than about 25 percent protein. More often, the protein content of the fibrous fraction ranges from about 5 percent to about 20 percent. Fiber content is generally estimated by determining the pentosan content and usually ranges from about 40 percent up to as high as 80 percent or even higher in some instances. It is roughly estimated that the pentosan or hemicellulose content generally constitutes about ⅔ of the total fiber present while the balance is cellulose. Thus, for example, if the pentosan content measures at about 40 percent, the total fiber content is usually estimated to be about 60 percent.

The fibrous fraction may be used as a source of animal feed or may be fractionated into cellulose and hemicellulose and utilized in replacement for any of the purposes for which cellulose and hemicellulose are now used.

The following examples illustrate typical modes in practicing the just described invention. It is understood, of course, that these examples are meant merely as illustrations and that the invention is not to be limited thereto. All percentages listed below are in terms of percent by weight.

EXAMPLE I

Corn germ was first softened by steeping for approximately 2 days in sulfur dioxide-containing warm water. The grain was then ground in a mill to liberate the germ. The germ was washed, dried, heated and subjected to a mechanical screw press to release the bulk of the oil contained therein. The residue was then flaked and extracted with hexane via a countercurrent flow method.

100 grams of the above extracted spent corn germ flake was then wetted with sufficient water to obtain a slurry. In order to release the proteinaceous fraction the slurry was then subjected to abrasion by means of an attrition mill. The attrition mill in this particular case was a Quaker City Laboratory Attrition Mill.

To classify the two fractions described above, the germ slurry was then screened on a bolting cloth having a 53 micron mesh size.

The tailings retained on the cloth were again passed through the attrition mill and also screened. The fibrous protein lean fraction which was retained on the cloth was washed with tap water and freeze-dried. The proteinaceous fraction which passed through the screen was centrifuged in a Sharples Supercentrifuge. The solids of this fraction were also freeze dried. The two samples analyzed as follows:

EXAMPLE II

Both of the fractions obtained were a light tan color. The protein rich fraction had a pleasing nutlike flavor. About 36 percent of the material was recovered as a protein rich fraction and 50 percent as a protein lean or fibrous fraction.

That only about 24 percent of the starch in the original germ flake could be accounted for in these fractions can be explained. The relatively high temperature and pressure to which the germ is subjected during the oil expelling process gelatinizes and dextrinizes much of the starch and thereby causes it to become water soluble. This portion of the starch is recovered in the solubles derived from the spent flake during milling.

The same sequence of steps are carried out here as outlined in example I with the exception that the spent corn germ from the wet milling process is only expelled, that is pressed in a mechanical screw press, and is not extracted with solvent. Comparable results are also obtained here.

EXAMPLE III

Here, solvent-extracted sorghum germ from a wet milling process is subjected to abrasion and separation as outlined in example I. Again, the two desired fractions are obtained without difficulty.

EXAMPLE IV

In this series of runs three spent cereal germs were abraded to remove protein and then classified by means of a cloth bolting screen having 53 micron apertures. The first material was a wet milled sorghum grain that had been oil-expelled, that is pressed in a mechanical screw press, but had not been extracted with solvent. A second sample obtained by a wet milling process was a spent corn germ flake which had been both screw pressed and then extracted with hexane. Lastly, a spent corn germ was abraded and classified, which germ had been previously isolated by dry milling and then pressed to remove germ oil.

The spent corn or sorghum germ flakes were again milled by attrition. Table II below sets out the results of the experiments. All percentages given are on a moisture-free basis and are in terms of weight percent.

TABLE II

|  | Wet-milled sorghum germ, expelled | Wet-milled corn germ, extracted | Dry-milled corn germ, expelled |
| --- | --- | --- | --- |
| Original germ flake: |  |  |  |
| Starch, percent | 20.9 | 25.7 | 37.4 |
| Protein, percent | 18.6 | 25.7 | 18.4 |
| Protein, percent starch-free basis | 22.6 | 34.6 | 29.4 |
| Fat, percent | 10.5 | 2.0 | 6.5 |
| Pentosans, percent | 22.4 | 28.5 | 14.4 |
| Protein to pentosan ratio | 0.80 | 0.91 | 1.28 |
| Oxide ash, percent d.b. | 1.18 | ------------ | 5.2 |
| "Fiber," plus 53 microns: |  |  |  |
| Starch, percent | 10.4 | 1.4 | 8.2 |
| Protein, percent | 17.6 | 17.6 | 17.6 |
| Protein, percent starch-free basis | 19.6 | 17.9 | 19.2 |

TABLE I

|  | Fibrous fraction | | Protein rich fraction | |
| --- | --- | --- | --- | --- |
| Extracted corn germ flake, percent dry basis | Percent composition, dry basis | Percent of starch, protein, fat, and pentosans of starting germ flake recovered in fibrous fraction | Percent composition, dry basis | Percent of starch, protein, fat, and pentosans of starting germ flake recovered in proteinaceous fraction |
| Starch | 25.7 | 0.5 | 1.0 | 16.7 | 23.1 |
| Protein | 25.7 | 16.0 | 31.2 | 32.9 | 45.6 |
| Fat | 2.0 | 1.2 | 28.5 | 1.55 | 26.0 |
| Pentosans | 28.5 | 42.0 | 73.6 | 14.7 | 18.4 |

Table II—Continued

| | | | |
|---|---|---|---|
| Fat, percent | 4.11 | | 1.1 |
| Pentosans, percent | 32.4 | 38.7 | 28.1 |
| Protein to pentosan ratio | 0.54 | 0.45 | 0.63 |
| Oxide ash, percent | 1.0 | | 2.1 |
| Percent of total | 42.9 | 54.5 | 33.4 |
| "Protein," minus 53 microns: | | | |
| Starch, percent | 31.8 | 26.8 | 58.3 |
| Protein, percent | 27.9 | 36.9 | 18.3 |
| Protein, percent starch-free basis | 40.9 | 53.7 | 44.6 |
| Fat, percent | 2.8 | | 1.2 |
| Pentosans, percent | 14.6 | 11.2 | 7.8 |
| Protein to pentosan ratio | 1.91 | 3.24 | 2.38 |
| Oxide ash, percent | 1.6 | | 4.8 |
| Percent of total | 31.7 | 24.1 | 43.2 |

EXAMPLE V

In this study an expelled spent corn germ from a wet milling process was abraded both by means of an attrition mill as described above and also by means of impact milling. A simulated impact mill was devised by utilizing dulled blades of a Waring Blender for 4 minutes. The attrition milling was accomplished by a double pass through a Quaker CITY Attrition Mill with plates set tightly.

The abraded corn germ was then separated into its two fractions either by screening or centrifuging the slurry. In the screening series of runs a number of screens were used having differing screen aperture as set out below. It can readily be seen that best results are obtained in terms of attaining proteinaceous fractions of a relatively high protein content if a screen is used having apertures in the vicinity of less than 40 microns, and most preferably in the neighborhood of about 20 microns. Excellent results are also obtained by classification through centrifugation.

Table IV—Continued

| | |
|---|---|
| Alanine amino acid/100 g protein | 6.4 |
| Valine amino acid/100 g protein | 5.2 |
| Leucine amino acid/100 g protein | 8.1 |
| Isoleucine amino acid/100 g protein | 3.0 |
| Phenylalanine amino acid/100 g protein | 4.9 |
| Serine amino acid/100 g protein | 4.9 |
| Threonine amino acid/100 g protein | 4.2 |
| Methionine amino acid/100 g protein | 2.4 |
| Proline amino acid/100 g protein | 4.4 |
| Cystine amino acid/100 g protein | 0.5 |
| Tyrosine amino acid/100 g protein | 3.5 |
| Aspartic Acid amino acid/100 g protein | 7.4 |
| Glutamic Acid amino acid/100 g protein | 14.3 |
| Lysine amino acid/100 g protein | 6.6 |
| Histidine amino acid/100 g protein | 4.2 |
| Arginine amino acid/100 g protein | 9.2 |
| Tryptophane amino acid/100 g protein | ...... |

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, ad as fall within the scope of the invention and the limits of the appended claims.

The invention is hereby claimed as follows:

1. A method of preparing a protein rich product useful for human consumption from a cereal germ which comprises the steps of pressing said germ by means of a screw press whereby the cells of said germ are thereby ruptured, freeing the protein

TABLE III

| Screen | Aperture | Yield, percent of total | | Protein, percent d.b. | | Starch, percent d.b. | | Pentosan, percent d.b. | |
|---|---|---|---|---|---|---|---|---|---|
| | | Attrition | Impact | Attrition | Impact | Attrition | Impact | Attrition | Impact |
| 50-mesh nylon | 330 | 9.7 | 52.1 | 18.3 | 19.2 | 2.1 | 4.8 | 33.3 | 27.4 |
| 80-mesh screen | 224 | 14.1 | 9.8 | 18.4 | 23.6 | 1.8 | 12.1 | 31.1 | 24.8 |
| 5028 nylon | 80 | 14.3 | 3.9 | 15.3 | 21.6 | 1.9 | 9.2 | 30.5 | 22.3 |
| 53 Nitex | 53 | 6.6 | 1.3 | 14.4 | 21.0 | 3.9 | | 30.7 | 25.8 |
| 42 Nitex | 42 | 4.7 | 0.9 | 17.7 | 25.9 | | | 30.4 | 18.0 |
| 20 Nitex | 20 | 6.2 | 2.5 | 40.2 | 31.9 | | | 32.6 | 11.4 |
| Super centrifuge | 20 | 23.9 | 16.7 | 46.5 | 42.4 | 22.8 | 35.4 | 10.0 | 3.2 |
| Solubles | | 13.4 | 10.5 | 32.3 | 39.5 | | | | |
| Total | | 97.7 | 92.9 | | | | | | |

EXAMPLE VI

In this run, dry corn germ was ground in a Bauer Double Disk Attrition Mill to produce particles of a size which passed through a 20 mesh screen. The ground material was slurried in hexane and the slurry processed through a series of 3inch diameter hydrocyclones to effect a separation of the smaller protein particles which were thus liberated by the treatment from the larger germ matrix or fibrous residue. The hexane was removed from the oil-protein mixture by evaporation and steam stripping. A high protein (59.5 percent) substance was obtained by filtering the oil-protein slurry and washing the solids with additional hexane. The solids were then dried to remove residual hexane. Analyses of these solids are shown in table IV. It should be noted that the amino acid balance of this protein makes it very desirable for human nutrition. The protein particles obtained were generally of a size of about one to three microns, and the protein yield was in the neighborhood of 36 percent of the original protein present.

TABLE IV

| | Sample A |
|---|---|
| Moisture and Volatiles % | 0.7 |
| Protein | 59.5 |
| Oil | 4.6 |
| Starch | 4.6 |
| Fiber | 2.5 |
| Glycine gm. amino acid/100 g protein | 5.6 | particles from the germ cell fragments by slurrying said ruptured germ in an aliphatic solvent, and agitating said slurry, centrifuging said slurry to produce a lighter protein rich fraction of reduced fiber content suspended in said aliphatic solvent and a heavier protein lean fiber germ residue fraction, and separating said protein rich fraction from the aliphatic solvent 2. A method of preparing a protein rich produce useful for human consumption from a cereal germ which comprises the steps of dry grinding said germ in order to rupture the cells of the germ, making a slurry of said ruptured germ in hexane solvent and agitating said slurry in order to free the protein particles from the germ cell fragments and produce a total mixture of hexane, germ oil and ruptured germ solids, centrifuging said mixture to produce a lighter faction of hexane, germ oil and protein rich germ solids, stripping off the hexane from said mixture, and filtering out said protein rich solids from said germ oil.

3. A method for preparing a protein rich produce useful for human consumption from a cereal germ comprising the steps of 1 rupturing the cells of a cereal germ, 2 forming a liquid slurry of the ruptured cereal germ cells, 3 abrading said ruptured germs in the slurry to free the protein particles from the germ cell fragments, and separating out from the slurry a protein rich germ fraction of reduced fiber content from a protein lean fibrous germ residue fraction.

4. The method of claim 3 wherein the slurry is an aqueous slurry.

5. The method of claim 3 wherein the liquid of the liquid slurry is a nonpolar solvent.

6. The method of claim 3 wherein the protein rich germ fraction of reduced fiber content is separated from the protein lean fibrous germ residue fraction by passing the liquid slurry through a screen having openings of a size sufficient to allow the smaller protein rich fraction to pass through and to retain the larger protein lean fibrous fraction 7. The method of claim 3 wherein the cereal germ is corn germ.

8. The method of claim 3 wherein the cereal germ is grain sorghum germ.

9. The method of claim 3 wherein the ruptured germ is abraded by means of an attrition mill.

* * * * *